United States Patent
Lee (10) Patent No.: US 10,803,001 B2
(45) Date of Patent: Oct. 13, 2020

(54) ELECTRONIC DEVICE AND OPERATING METHOD THEREOF

(71) Applicant: Wistron Corporation, New Taipei (TW)

(72) Inventor: Ming-Chun Lee, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 15/993,602

(22) Filed: May 31, 2018

(65) Prior Publication Data
US 2019/0303329 A1 Oct. 3, 2019

(30) Foreign Application Priority Data
Mar. 27, 2018 (TW) .............................. 107110381 U (51) Int. Cl.
- G06F 21/57 (2013.01)
- G06F 11/14 (2006.01)
- G06F 13/40 (2006.01)
- G06F 13/16 (2006.01)

(52) U.S. Cl.
CPC ...... G06F 13/4022 (2013.01); G06F 13/1668 (2013.01)

(58) Field of Classification Search
None
See application file for complete search history.

(56) References Cited

U.S. PATENT DOCUMENTS

| | | | | |
|---|---|---|---|---|
| 2006/0225067 A1* | 10/2006 | Yang | ............... | G06F 8/65 717/168 |
| 2007/0022175 A1* | 1/2007 | Lu | ............... | G06F 11/2294 709/217 |
| 2007/0174689 A1* | 7/2007 | Chen | ............... | G06F 11/1417 714/13 |
| 2010/0250832 A1* | 9/2010 | Zhang | ............... | G06F 11/1441 711/103 |

(Continued)

FOREIGN PATENT DOCUMENTS

| CN | 107168829 | 9/2017 |
|---|---|---|
| EP | 2741228 | 6/2014 |

(Continued)

OTHER PUBLICATIONS

"Office Action of Taiwan Counterpart Application", dated Jan. 14, 2019, p. 1-p. 11.

(Continued)

*Primary Examiner* — Hyun Nam
(74) *Attorney, Agent, or Firm* — JCIPRNET (57) ABSTRACT

An electronic device and an operating method therefore are provided. The electronic device includes two or more memories, a platform controller, a first switch circuit and an auxiliary controller. The two or more memories store basic input output systems respectively. The first switch circuit is coupled between the platform controller and the two or more memories. The auxiliary controller obtains a status of the platform controller. The auxiliary controller generates a first selection signal to the first switch circuit based on the status of the platform controller, and the platform controller is selectively connected to one of the two or more memories based on the first selection signal by the first switch circuit.

23 Claims, 3 Drawing Sheets

(56) References Cited

U.S. PATENT DOCUMENTS

| | | | | |
|---|---|---|---|---|
| 2013/0305027 A1* | 11/2013 | Jiang | ................ | G06F 9/4401 |
| | | | | 713/2 |
| 2015/0149815 A1* | 5/2015 | Maity | ............. | G06F 11/0706 |
| | | | | 714/5.11 |
| 2015/0309903 A1* | 10/2015 | Zhao | ............... | G06F 11/1417 |
| | | | | 714/14 |
| 2019/0212999 A1* | 7/2019 | Chen | ................ | G06F 3/0671 |

FOREIGN PATENT DOCUMENTS

| | | |
|---|---|---|
| KR | 20090033646 | 4/2009 |
| TW | 200912659 | 3/2009 |

OTHER PUBLICATIONS

"Office Action of India Counterpart Application", dated Jun. 7, 2020, p. 1-p. 5.

\* cited by examiner

ELECTRONIC DEVICE AND OPERATING METHOD THEREOF

CROSS-REFERENCE TO RELATED APPLICATION

This application claims the priority benefit of Taiwan application serial no. 107110381, filed on Mar. 27, 2018. The entirety of the above-mentioned patent application is hereby incorporated by reference herein and made a part of this specification.

BACKGROUND OF THE INVENTION

1. Field of the Invention

The invention relates to an electronic device and an operating method thereof, and particularly relates to an electronic device having a backup memory mechanism and an operating method thereof.

2. Description of Related Art

In recent years, there have been demands requesting image files of the basic input output system (BIOS) stored in the memories of products requiring high reliability (e.g., storage servers, personal computers, and/or the like) be provided with a backup mechanism to ensure smooth booting of these products. In other words, when a primary memory is damaged or booting of a system based on the primary memory fails, the system may still be booted based on the image file of the BIOS stored in another backup memory.

A BIOS backup mechanism proposed by Intel, among others, is more common nowadays. In the backup mechanism proposed by Intel, two identical or different BIOS image files are stored in a memory having a greater capacity, so that the image files may serve as backups for each other. When the first BIOS image file in the memory is damaged, the system may access the second BIOS image file in the same memory and boot the electronic device accordingly. However, such backup mechanism does not touch upon a fundamental issue, i.e., the system still cannot be booted based on the second BIOS image file if the primary memory having a greater capacity is damaged. Thus, how to implement a backup memory mechanism in a desirable manner has become an issue to work on.

SUMMARY OF THE INVENTION

Exemplary embodiments of the invention provide an electronic device and an operating method of the electronic device. According to the electronic device and the operating method, a platform controller is provided with a backup/redundant memory mechanism by using two memories and through switching by an auxiliary controller.

An electronic device according to an embodiment of the invention includes two or more memories, a platform controller, a first switch circuit, and an auxiliary controller. The two or more memories store basic input output systems respectively. The first switch circuit is coupled between the platform controller and the two or more memories. The auxiliary controller obtains a status of the platform controller. The auxiliary controller generates a first selection signal to the first switch circuit based on the status of the platform controller, and the platform controller is selectively connected to one of the two or more memories based on the first selection signal by the first switch circuit.

An electronic device according to another embodiment of the invention includes two or more memories, a platform controller, a first switch circuit, and an auxiliary controller. The two or more memories store basic input output systems respectively. The first switch circuit is coupled between the platform controller and the two or more memories and has a first path and a second path. The auxiliary controller obtains a status of the platform controller. The auxiliary controller generates a first selection signal to the first switch circuit based on the status of the platform controller. The first switch circuit selectively connects the platform controller to one of the two or more memories via the first path and selectively connects the auxiliary controller to another of the two or more memories via the second path based on the first selection signal. The first path is different from the second path.

An embodiment of the invention provides an operating method of an electronic device. The electronic device includes two or more memories, a platform controller, a first switch circuit and an auxiliary controller. The operation method includes the following steps. A status of the platform controller is provided to the auxiliary controller, and a first selection signal is generated to the first switch circuit based on the status of the platform controller. In addition, the platform controller is selectively connected to one of the two or more memories by the first switch circuit based on the first selection signal.

Based on the above, in the embodiments of the invention, the auxiliary controller obtains the status of the platform controller to learn whether the booting operation performed by the platform controller on the electronic device is successful. When the platform controller performs the boot operation based on the BIOS in one of the two or more memories and the boot operation fails, the platform controller may provide the status to the auxiliary controller. The auxiliary controller may generate the first selection signal based on the received status and switch the first memory coupled to the platform controller to another backup memory (e.g., a second memory) of the two or more memories, and resume the booting operation based on the BIOS in the memory. Since the auxiliary controller is adopted to switch the memory, the electronic device is provided with the backup memory mechanism without modifying a booting mechanism of the platform controller for the whole electronic device.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
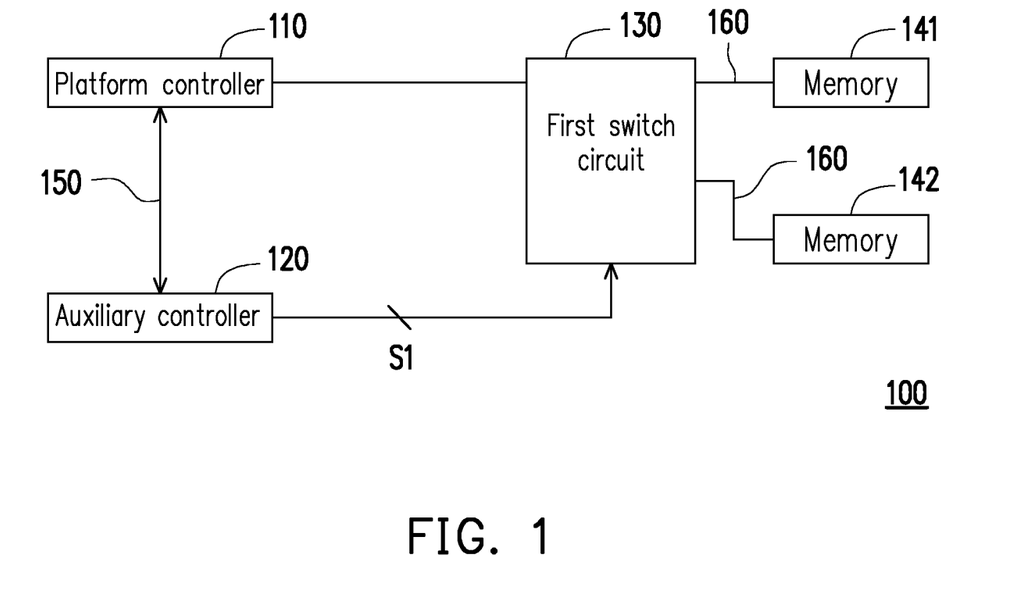
FIG. 1 is a schematic view illustrating an electronic device according to an embodiment of the invention.

FIG. 1 is a schematic view illustrating an electronic device according to an embodiment of the invention. An electronic device 100 of the embodiment includes a platform controller 110, an auxiliary controller 120, a first switch circuit 130, a first bus 150, a second bus 160, and two or more memories. For the ease of description, only two memories (i.e., a first memory 141 and a second memory 142) are shown in the embodiment. However, the number of the memories in the electronic device 100 may be set based on practical needs, and the number of the memories may be two or more as a backup for each other. Thus, the invention does not intend to limit the number of memories in the electronic device 100. The electronic device 100 is a server or a personal computer, for example. However, the invention is not limited thereto.

The platform controller 110 is coupled to a first switch circuit 130, and is selectively connected to the memories 141 and 142 through the first switch circuit 130. The auxiliary controller 120 communicates with the platform controller 110 through the first bus 150, and obtains a current status of the platform controller 110 through the first bus 150, so as to generate a first selection signal S1 based on the current status of the platform controller 110. The platform controller 110 is a platform controller hub (PCH), for example. The auxiliary controller 120 is a baseboard management controller (BMC), for example. In addition, the first bus 150 is one of a system management bus (SMBus), a low pin count (LPC) interface, and a system management link (SMLink), for example.

The first switch circuit 130 is coupled between the platform controller 110 and the memories 141 and 142. The first switch circuit 130 may selectively connect the platform controller 110 to the memories 141 and 142 based on the first selection signal S1 generated by the auxiliary controller 120. Accordingly, the platform controller 110 may selectively perform a booting operation on the electronic device 100 based on one of the memories 141 and 142. Each of the memories 141 and 142 stores a basic input output system (BIOS). The memories 141 and 142 are, for example, read-only memories, EEPROMs, flash memories, or other storage media. The invention does not intend to impose a limitation on this regard.

According to an embodiment of the invention, the second bus 160 may be disposed to transmit data from the platform controller 110 to the memory 141 or 142 and/or data between the auxiliary controller 120 and the memory 141 or 142. In other words, when the platform controller 110 and the memory 141 or 142 of the embodiment are connected to each other, the platform controller 110 and the memory 141 or 142 are coupled to each other through the second bus 160. In addition, the auxiliary controller 120 and the memory 141 or 142 are also coupled to each other via the second bus 160 when the auxiliary controller 120 and the memory 141 or 142 are connected to each other. Moreover, the first switch circuit 130 is capable of controlling a coupling direction of the second bus 160. The second bus 160 of the embodiment is a serial peripheral interface (SPI) bus. The first switch circuit 130 is a bus switch, for example.

In the following, the operation among the platform controller 110, the auxiliary controller 120, and the first switch circuit 130 is described. The platform controller 110 of the embodiment communicates with the auxiliary controller 120 through the first bus 150. Accordingly, the auxiliary controller 120 may obtain the current status of the platform controller 110 via the first bus 150. Then, the auxiliary controller 120 generates the first selection signal S1 based on the current status of the platform controller 110, and transmits the first selection signal S1 to the first switch circuit 130 to control the first switch circuit 130. Based on the first selection signal S1, the first switch circuit 130 may selectively switch between connections between the platform controller 110 and the memories 141 and 142. When one of the memories coupled to the platform controller 110 is damaged or when the electronic device 100 is unable to be booted successfully based on the memory, the auxiliary controller 120 may couple the platform controller 110 to another backup memory to resume to booting the electronic device 100. Accordingly, a backup mechanism with a backup memory is provided.

The embodiment of the invention is described in greater detail in the following based on a scenario where the platform controller 110 performs a booting operation on the electronic device 100. "Booting" described herein refers to a status where the power of the electronic device 100 is at a S0 stage and the electronic device 100 operates normally. When the platform controller 110 is connected to one (the memory 141, for example) of the memories 141 and 142 via the first switch circuit 130, the platform controller 110 boots the electronic device 100 based on the BIOS in the memory 141. If the booting of the electronic device 100 fails, the platform controller 110 may communicate with the auxiliary controller 120 via the first bus 150 and pass on the status. Via the first bus 150, the auxiliary controller 120 receives the status that the platform controller 110 boots the electronic device 100 based on the BIOS in the memory 141 but fails, generates the first selection signal S1 based on the status, and transmits the first selection signal S1 to the first switch circuit 130.

After receiving the first selection signal S1, the first switch circuit 130 disconnects the connection between the platform controller 110 and the memory 141 and connects the platform controller 100 to the memory 142 based on the first selection signal S1. Accordingly, the platform controller 110 may resume booting of the electronic device 100 based on the BIOS in the memory 142. In this way, when one of the memories 141 and 142 coupled to the platform controller 110 is damaged, the platform controller 110 is still able to boot the electronic device 100 based on another memory through functioning of the backup memory mechanism.

Figure 2:
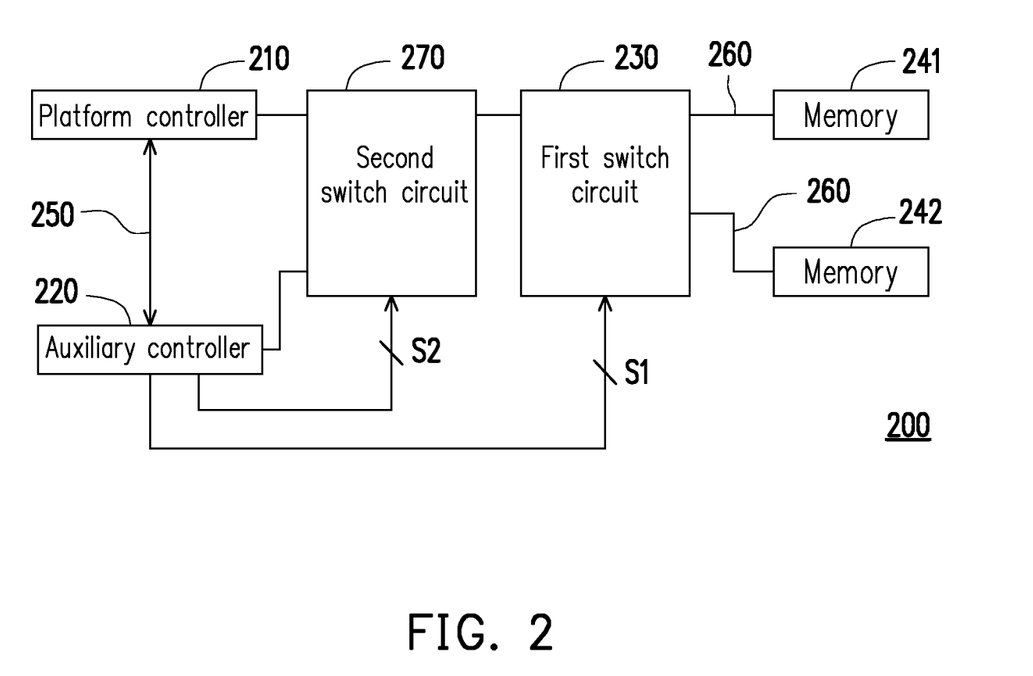
FIG. 2 is a schematic view illustrating an electronic device according to another embodiment of the invention.

FIG. 2 is a schematic view illustrating an electronic device according to another embodiment of the invention. Referring to FIG. 2, what FIG. 2 differs from the embodiment of FIG. 1 is that an electronic device 200 of the embodiment further includes a second switch circuit 270 coupled among a platform controller 210, an auxiliary controller 220, and a first switch circuit 230. Therefore, in addition to generating the first selection signal S1 based on a status of the platform controller 210 to control the first switch circuit 230, the auxiliary controller 220 of the embodiment may also generate a second selection signal S2 to the second switch circuit 270 to exert control based on the status of the platform controller 210. Accordingly, the second switch circuit 270 may selectively connect one of the platform controller 210 and the auxiliary controller 220 to the first switch circuit 230 based on the second selection signal S2.

Specifically, the electronic device 200 of the embodiment includes the platform controller 210, the auxiliary controller 220, the first switch circuit 230, a first bus 250, a second bus 260, the second switch circuit 270, and memories 241 and 242. In the electronic device 200 of the embodiment, the number of the memories may also be set based on practical needs and may be two or more. The invention does not intend to limit the number of the memories.

In addition, in the embodiment of the invention, data between the platform controller 210 as well as the auxiliary controller 220 and the memories 241 and 242 may be transmitted via the second bus 260. The second bus 260 is a serial peripheral interface (SPI) bus. Moreover, the first switch circuit 230 and the second switch circuit 270 are bus switches, for example. Details in a scenario of booting the second electronic device 200 with the platform controller 210 in the embodiment are similar to the process for the electronic device 100. Thus, details in this regard will not be further described in the following.

In addition to the backup memory mechanism, the electronic device 200 of the embodiment further includes an alternate update mechanism for the two or more memories (e.g., the memories 241 and 242). Here, a scenario where the auxiliary controller 220 updates the memories 241 and 242 is described as an example. When the electronic device 200 is in a shut down status, the platform controller 210 may communicate with the auxiliary controller 220 through the first bus 250. Accordingly, the auxiliary controller 220 may obtain the status of the platform controller 210 via the first bus 250, and learn that the electronic device 200 is currently in the shut down status (e.g., the power of the electronic device 200 is at a S5 stage). Then, based on the shut down status of the electronic device 200, the auxiliary controller 220 may respectively generate the first selection signal S1 and the second selection signal S2, and may respectively transmit the first selection signal S1 and the second selection signal S2 to the first switch circuit 230 and the second switch circuit 270.

After receiving the second selection signal S2, the second switch circuit 270 may disconnect a connection between the platform controller 210 and the first switch circuit 230 based on the second selection signal S2, and connect the auxiliary controller 220 to the first switch circuit 230. Meanwhile, after receiving the first selection signal S1, the first switch circuit 230 may connect the auxiliary controller 220 to one of the memories 241 and 242 (the memory 241, for example) based on the first selection signal S1. Accordingly, the auxiliary controller 220 may update the memory 241. After the update is completed, the auxiliary controller 220 may transmit the first selection signal S1 to the first switch circuit 230 again. After receiving the first selection signal S1, the first switch circuit 230 may connect the auxiliary controller 220 to the memory 242 based on the first selection signal S1. Accordingly, the auxiliary controller 220 is able to alternately perform operations such as preliminary inspection and update on BIOS image files of the memory 241 and 242.

Figure 3A:
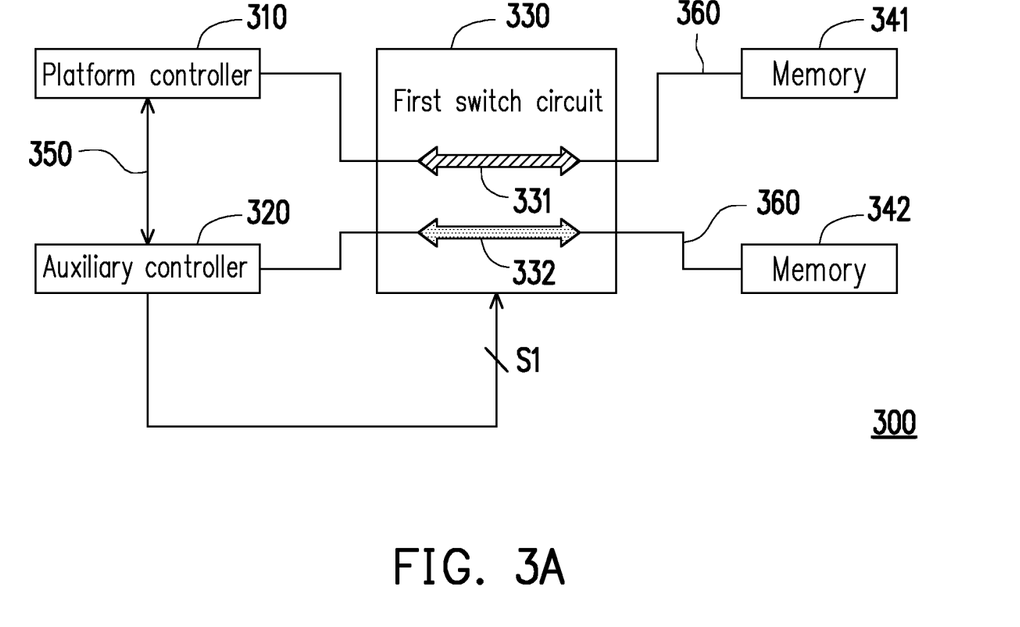
FIG. 3A is a schematic view illustrating an electronic device according to another embodiment of the invention.
Figure 3B:
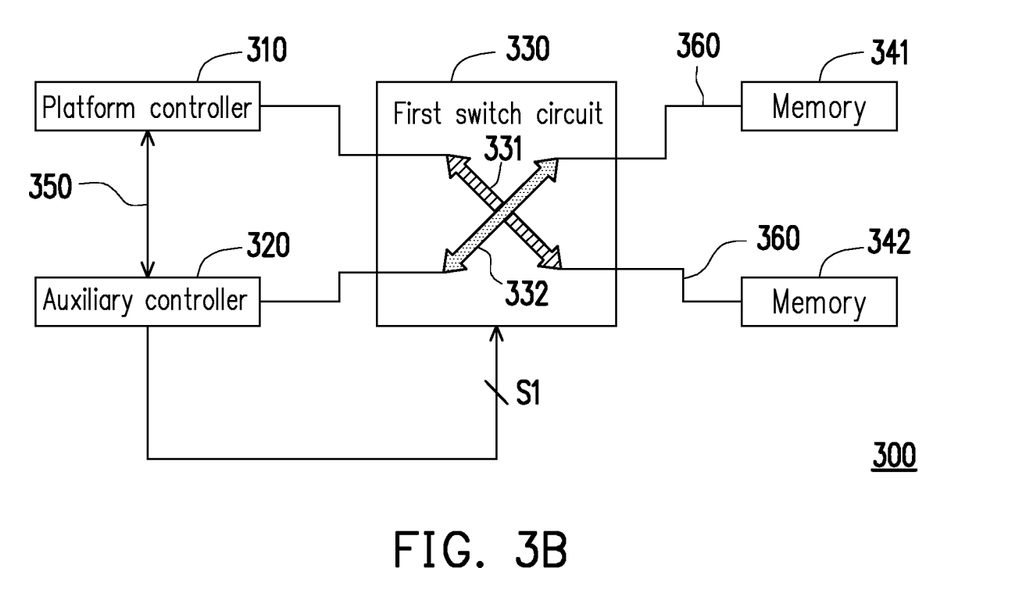
FIG. 3B is a schematic view illustrating the electronic device shown in the embodiment of FIG. 3A.

FIG. 3A is a schematic view illustrating an electronic device according to another embodiment of the invention. FIG. 3B is a schematic view illustrating the electronic device shown in the embodiment of FIG. 3A. Referring to FIGS. 3A and 3B at the same time, what FIGS. 3A and 3B differ from the embodiment of FIG. 1 is that, a first switch circuit 330 of an electronic device 300 of the embodiment has a first path 331 and a second path 332. The first path 331 and the second path 332 are different paths, and may also be two physically separated paths. FIGS. 3B and 3A show switching statuses of the first path 331 and the second path 332 in the first switch circuit 330. In the first switch circuit 330 of FIG. 3A, the first path 331 is connected to a memory 341, and the second path 332 is connected to a memory 342. In the first switch circuit 330 of FIG. 3B, the first path 331 is connected to the memory 342, and the second path 332 is connected to the memory 341. In other words, the first switch circuit 330 may selectively connect the first path 331 and the second path 332 respectively to the memories 341 and 342 based on the first selection signal S1.

Thus, in the embodiment, an auxiliary controller 320 may generate the first selection signal S1 based on a status of the platform controller 310 and transmit the first selection signal S1 to the first switch circuit 330. The first switch circuit 330 may connect the platform controller 310 to one of the memories 341 and 342 (the memory 341, for example) via the first path 331, and connect the auxiliary controller 320 to another of the memories 341 and 342 (the memory 342, for example) via the second path 332.

The electronic device 300 of the embodiment includes the platform controller 310, the auxiliary controller 320, the first switch circuit 330, a first bus 350, a second bus 360, and the memories 341 and 342. In the electronic device 300 of the embodiment, the number of the memories may also be set based on practical needs and may be two or more. The invention does not intend to limit the number of the memories.

The embodiments of the invention is described in greater detail in the following based on a scenario where the platform controller 310 performs a booting operation on the electronic device 300. Assuming that the platform controller 310 is connected to one of the memories 341 and 342 (the memory 341, for example) via the first path 331 of the first switch circuit 330 and boots the electronic device 300 based on the BIOS in the memory 341, if the electronic device 300 is not booted successfully, the platform controller 310 may communicate with the auxiliary controller 320 via the first bus 350. Under the circumstance, the auxiliary controller 320 may receive a status that the platform controller 310 boots the electronic device 300 based on the memory 341 and fails via the first bus 350, generate the first signal S1 based on the status, and transmit the first selection signal S1 to the first switch circuit 330.

After receiving the first selection signal S1, the first switch circuit 330 may switch the memory 341 originally connected to the first path 331 and connect the memory 341 to the second path 332 (as shown in FIG. 3B) based on the first selection signal S1. Accordingly, the memory 341 is connected to the auxiliary controller 320 via the second path 332. In addition, the first switch circuit 330 may switch the memory 342 originally connected to the second path 332 based on the first selection signal S1 to connect the memory 342 to the first path 331 (as shown in FIG. 3B). Accordingly, the platform controller 310 may be connected to the memory 342 via the first path 331 and resume booting of the electronic device 300 based on the BIOS in the memory 342. Accordingly, when one of the memories 341 and 342 connected to the platform controller 310 is damaged, the platform controller 310 is still able to resume the booting based on another memory. Therefore, the electronic device 300 is provided a backup memory mechanism.

Besides, in addition to the backup memory mechanism, the electronic device 300 of the embodiment further includes an alternate update mechanism for two or more memories (e.g., the memories 341 and 342). Here, a scenario where the auxiliary controller 320 updates the memories 341 and 342 is described as an example. When the electronic device 300 is in a shut down status, the platform controller 310 may communicate with the auxiliary controller 320 via the first bus 350. Thus, the auxiliary controller 320 may obtain a current status of the platform controller 310 via the first bus 350 and thereby learn that the electronic device 300 is currently shut down based on the status. Based on the shut down status of the electronic device 300, the auxiliary controller 320 may generate the first selection signal S1 and transmit the first selection signal S1 to the first switch circuit 330.

After receiving the first selection signal S1, the first switch circuit 330 may connect one of the memories 341 and 342 (the memory 341, for example) to the auxiliary controller 320 via the second path 332 based on the first selection signal S1, as shown in FIG. 3B. Under the circumstance, the auxiliary controller 320 may update the memory 341 and transmit the first selection signal S1 again to the first switch circuit 330 after the update completes. Accordingly, after receiving the first selection signal S1, the first switch circuit 330 may connect the auxiliary controller 320 to the memory 342 via the second path 332 based on the first selection signal S1, as shown in FIG. 3A, so as to update the memory 342. In this way, the auxiliary controller 320 may alternately perform operations, such as preliminary inspection and update operations, on the BIOS image files of the memories 341 and 342.

The electronic device 300 of the embodiment is further provided with a run-time memory update mechanism. In the following, a scenario where the auxiliary controller 320 updates the memories 341 and 342 during the run time of the electronic device 300 is described as an example. Assuming that the platform controller 310 is connected to the memory 341 via the first path 331 in the first switch circuit 330 (as shown in FIG. 3A) and boots the electronic device 300 based on the BIOS in the memory 341, when the electronic device 300 is booted successfully, the auxiliary controller 320 may be connected to the memory 342 via the second path 332 of the first switch circuit 330 to update the memory 342 during the run time of the electronic device 300.

Alternatively, assuming that the platform controller 310 is connected to the memory 342 via the first path 331 in the first switch circuit 330 (as shown in FIG. 3B) and boots the electronic device 300 based on the BIOS in the memory 342, when the electronic device 300 is booted successfully, the auxiliary controller 340 may be connected to the memory 341 via the second path 332 of the first switch circuit 330 to update the memory 341 during the run time of the electronic device 300. Accordingly, the electronic device 300 is provided with the run-time memory update mechanism.

Based on the above, in the electronic device 300 of the embodiment, the auxiliary controller 320 may update the memories 341 and 342 no matter in a run time or a shut down period of the electronic device 300. Therefore, when the platform controller 310 is to perform the next booting operation on the electronic device 300 after the electronic device 300 is shut down, the auxiliary controller 320 may generate the first selection signal S1 to the first switch circuit 330 based on a status that the platform controller 310 has a booting request, so as to choose a most updated memory (e.g., the memories 341 and 342) and connect the most updated memory to the platform controller 310. Accordingly, the platform controller 310 may boot the electronic device 300 based on the most updated memory (e.g., the memories 341 and 342).

Figure 4:
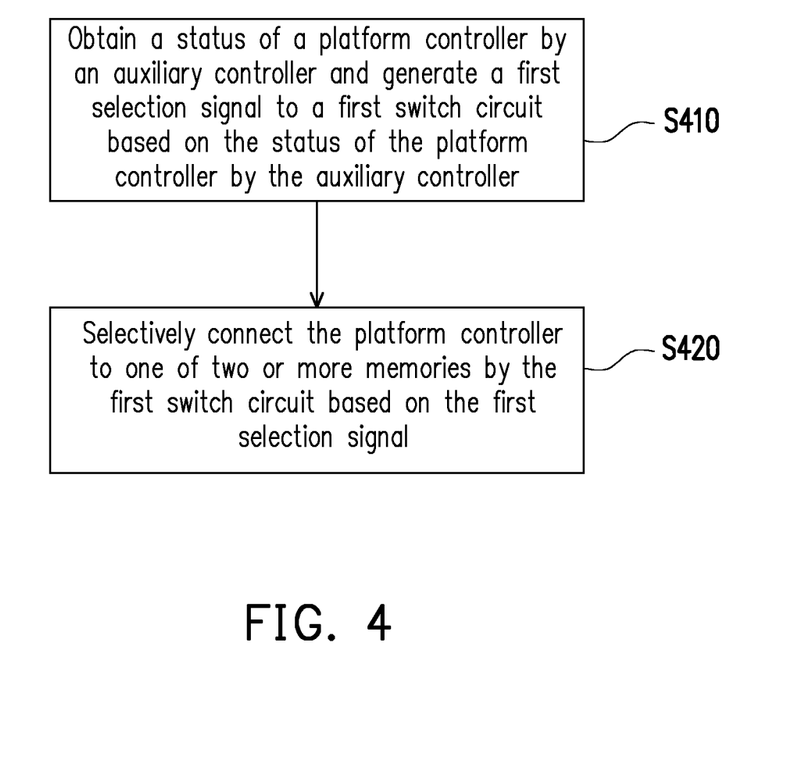
FIG. 4 is a flowchart illustrating an operating method of an electronic device according to an embodiment of the invention.

FIG. 4 is a flowchart illustrating an operating method of an electronic device according to an embodiment of the invention. Referring to FIG. 4, at Step S410, an auxiliary controller may obtain a status of a platform controller and generate a first selection signal to a first switch circuit based on the status of the platform controller. Then, at Step S420, the first switch circuit may selectively connect the platform controller to one of two or more memories based on the first selection signal. Detailed procedures and operations of Steps S410 to S420 may be referred to the above embodiments.

In view of the foregoing, in the embodiments of the invention, the auxiliary controller obtains the status of the platform controller to learn whether the booting operation performed by the platform controller on the electronic device is successful. When the platform controller performs the boot operation based on the BIOS in the first memory of the two or more memories and the boot operation fails, the platform controller may provide the status to the auxiliary controller. The auxiliary controller may generate the first selection signal based on the received status and switch the first memory coupled to the platform controller to another backup memory (e.g., a second memory) of the two or more memories, and resume the booting operation based on the BIOS in the memory. Since the auxiliary controller is adopted to switch the memory, the electronic device is provided with the backup memory mechanism without modifying a booting mechanism of the platform controller for the whole electronic device. Besides, the auxiliary controller (e.g., a baseboard management controller) may further perform preliminary inspection on the first memory that is potentially damaged and attempt to recover the BIOS image file of the memory to maintain the BIOS update function of the auxiliary controller on the two memories.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic device, comprising:
two or more memories, respectively storing basic input output systems;
a platform controller;
a first switch circuit, coupled between the platform controller and the two or more memories; and
an auxiliary controller, obtaining a status of the platform controller,
wherein the auxiliary controller generates a first selection signal to the first switch circuit based on the status of the platform controller, the first switch circuit selectively connects the platform controller to a first memory of the two or more memories based on the first selection signal and selectively connects the auxiliary controller to a second memory of the two or more memories based on the first selection signal, and
wherein when the platform controller is connected to the first memory of the two or more memories via a first path of the first switch circuit to boot the electronic device and the electronic device is successfully booted, the first switch circuit is operated to connect the auxiliary controller to the second memory of the two or more memories based on the first selection signal, the auxiliary controller updates the second memory of the two or more memories via a second path of the first switch circuit.

2. The electronic device as claimed in claim 1, further comprising:
a second switch circuit, coupled among the platform controller, the auxiliary controller, and the first switch circuit,
wherein the auxiliary controller generates a second selection signal to the second switch circuit based on the status of the platform controller, and the second switch circuit selectively connects one of the platform controller and the auxiliary controller to the first switch circuit based on the second selection signal.

3. The electronic device as claimed in claim 2, wherein when the status of the platform controller received by the auxiliary controller indicates that the electronic device is in a shut down status, the auxiliary controller generates the first selection signal to the first switch circuit and generates the second selection signal to the second switch circuit, respectively, the second switch circuit disconnects a connection between the platform controller and the first switch circuit based on the second selection signal and connects the auxiliary controller to the first switch circuit, and the first switch circuit alternately connects the auxiliary controller to one of the two or more memories based on the first selection signal, such that the auxiliary controller alternately updates the two or more memories.

4. The electronic device as claimed in claim 1, wherein when the platform controller is connected to a first memory of the two or more memories via the first switch circuit to boot the electronic device and the electronic device is not booted successfully, the auxiliary controller generates the first selection signal to the first switch circuit based on the status of the platform controller, the first switch circuit disconnects a connection between the platform controller and the first memory based on the first selection signal and connects the platform controller to a second memory of the two or more memories via the first switch circuit based on the first selection signal, such that the platform controller resumes booting of the electronic device.

5. The electronic device as claimed in claim 1, wherein the platform controller is a platform controller hub (PCH), and the auxiliary controller is a baseboard management controller (BMC).

6. The electronic device as claimed in claim 1, wherein the platform controller communicates with the auxiliary controller via a first bus, and
the first bus comprises one of a system management bus (SMBus), a low pin count (LPC) interface, and a system management link.

7. The electronic device as claimed in claim 1, wherein the platform controller, the auxiliary controller, and the two or more memories transmit data via a second bus, and
the second bus is a serial peripheral interface (SPI) bus.

8. An electronic device, comprising:
two or more memories, respectively storing basic input output systems;
a platform controller;
a first switch circuit, coupled between the platform controller and the two or more memories and having a first path and a second path; and
an auxiliary controller, obtaining a status of the platform controller,
wherein the auxiliary controller generates a first selection signal to the first switch circuit based on status of the platform controller, the first switch circuit selectively connects the platform controller to a first memory of the two or more memories via the first path based on the first selection signal and selectively connects the auxiliary controller to a second memory of the two or more memories via the second path based on the first selection signal,
wherein when the platform controller is connected to the first memory of the two or more memories via the first path of the first switch circuit to boot the electronic device and the electronic device is successfully booted, the first switch circuit is operated to connect the auxiliary controller to the second memory of the two or more memories based on the first selection signal, the auxiliary controller updates the second memory of the two or more memories via the second path of the first switch circuit, and
wherein the first path is different from the second path.

9. The electronic device as claimed in claim 8, wherein when the platform controller is connected to the first memory of the two or more memories via the first path of the first switch circuit to boot the electronic device and the electronic device is not booted successfully, the auxiliary controller generates the first selection signal to the first switch circuit based on the status of the platform controller, the first switch circuit connects the first memory to the auxiliary controller via the second path based on the first selection signal and connects the platform controller to the second memory of the two or more memories via the first path of the first switch circuit based on the first selection signal, so as to resume booting of the electronic device.

10. The electronic device as claimed in claim 8, wherein when the status of the platform controller received by the auxiliary controller indicates that the electronic device is in a shut down status, the auxiliary controller generates the first selection signal to the first switch circuit based on the status, and the first switch circuit alternately connects one of the two or more memories to the auxiliary controller via the second path based on the first selection signal, such that the auxiliary controller alternately updates the two or more memories.

11. The electronic device as claimed in claim 8, wherein the platform controller is a platform controller hub, and the auxiliary controller is a baseboard management controller.

12. The electronic device as claimed in claim 8, wherein the platform controller communicates with the auxiliary controller via a first bus, and
the first bus is one of a system management bus, a low pin count interface, and a system management link.

13. The electronic device as claimed in claim 8, wherein the platform controller, the auxiliary controller, and the two or more memories transmit data via a second bus, and
the second bus is a serial peripheral interface bus.

14. An operating method of an electronic device, wherein the electronic device comprises two or more memories, a platform controller, a first switch circuit, and an auxiliary controller, the operating method comprising:
obtaining a status of the platform controller by the auxiliary controller, and generating a first selection signal to the first switch circuit based on the status of the platform controller by the auxiliary controller; and
selectively connecting the platform controller to a first memory of the two or more memories by the first switch circuit based on the first selection signal and selectively connecting the auxiliary controller to a second memory of the two or more memories based on the first selection signal; and connecting the auxiliary controller to the second memory of the two or more memories based on the first selection signal and updating the second memory of the two or more memories by the auxiliary controller via a second path of the first switch circuit when the platform controller is connected to the first memory of the two or more memories via a first path of the first switch circuit to boot the electronic device and the electronic device is successfully booted, wherein the first path is different from the second path.

15. The operating method as claimed in claim 14, further comprising:
selectively connecting the auxiliary controller to another of the two or more memories by the first switch circuit based on the first selection signal.

16. The operating method as claimed in claim 15, further comprising:
generating the first selection signal to the first switch circuit by the auxiliary controller based on the status of the platform controller, and connecting a first memory of the two or more memories to the auxiliary controller by the first switch circuit via a second path of the first switch circuit based on the first selection signal and connecting the platform controller to a second memory of the two or more memories by the first switch circuit via a first path of the first switch circuit based on the first selection signal to resume booting of the electronic device when the platform controller is connected to the first memory of the two or more memories via the first path of the first switch circuit to boot the electronic device and the electronic device is not booted successfully,
wherein the first path is different from the second path.

17. The operating method as claimed in claim 15, further comprising:
generating the first selection signal to the first switch circuit by the auxiliary controller based on the status, and alternately connecting one of the two or more memories to the auxiliary controller by the first switch circuit via a second path in the first switch circuit based on the first selection signal when the status of the platform controller received by the auxiliary controller indicates that the electronic device is in a shut down status, such that the auxiliary controller alternately updates the two or more memories.

18. The operating method as claimed in claim 14, further comprising:
generating a second selection signal to a second switch circuit by the auxiliary controller based on the status of the platform controller, and selectively connecting one of the platform controller and the auxiliary controller to the first switch circuit by the second switch circuit based on the second selection signal.

19. The operating method as claimed in claim 18, further comprising:
respectively generating the first selection signal to the first switch circuit and the second selection signal to the second switch circuit by the auxiliary controller when the status of the platform controller received by the auxiliary controller indicates that the electronic device is in the shut down status, wherein the second switch circuit disconnects a connection between the platform controller and the first switch circuit based on the second selection signal and connects the auxiliary controller to the first switch circuit, and the first switch circuit alternately connects one of the two or more memories to the auxiliary controller based on the first selection signal, such that the auxiliary controller alternately updates the two or more memories.

20. The operating method as claimed in claim 18, further comprising:
generating the first selection signal to the first switch circuit by the auxiliary controller based on the status of the platform controller, disconnecting a connection between the platform controller and a first memory of the two or more memories by the first switch circuit based on the first selection signal, and connecting the platform controller to a second memory of the two or more memories via the first switch circuit based on the first selection signal to resume booting of the electronic device when the platform controller is connected to the first memory via the first switch circuit to boot the electronic device and the electronic device is not booted successfully.

21. The operating method as claimed in claim 14, wherein the platform controller is a platform controller hub, and the auxiliary controller is a baseboard management controller.

22. The operating method as claimed in claim 14, wherein the platform controller communicates with the auxiliary controller via a first bus,
the first bus is one of a system management bus, a low pin count interface, and a system management link.

23. The operating method as claimed in claim 14, wherein the platform controller, the auxiliary controller, and the two or more memories transmit data via a second bus, and
the second bus is a serial peripheral interface bus.

* * * * *